(12) United States Patent
Heikenfeld et al.

(10) Patent No.: US 9,122,005 B2
(45) Date of Patent: Sep. 1, 2015

(54) ELECTROWETTING RETROREFLECTOR DEVICES, SYSTEMS, AND METHODS

(75) Inventors: Jason Heikenfeld, Cincinnati, OH (US); Murali Kilaru, Cincinnati, OH (US); Phillip Schultz, Taylor Mill, KY (US); Daniel J. O'Neill, Montgomery, OH (US)

(73) Assignee: University Of Cincinnati, Cincinnati, OH (US)

( * ) Notice: Subject to any disclaimer, the term of this patent is extended or adjusted under 35 U.S.C. 154(b) by 1729 days.

(21) Appl. No.: 12/405,821

(22) Filed: Mar. 17, 2009

(65) Prior Publication Data

US 2009/0232509 A1 Sep. 17, 2009

Related U.S. Application Data

(60) Provisional application No. 61/037,123, filed on Mar. 17, 2008.

(51) Int. Cl.
| | |
|---|---|
| *H04B 10/00* | (2013.01) |
| *G02B 5/124* | (2006.01) |
| *G02B 5/128* | (2006.01) |
| *G02B 26/00* | (2006.01) |

(52) U.S. Cl.
CPC ............... *G02B 5/124* (2013.01); *G02B 5/128* (2013.01); *G02B 26/005* (2013.01)

(58) Field of Classification Search
CPC .................................................. G02B 26/005
USPC ........... 398/168–170; 359/318, 529, 533, 539
See application file for complete search history.

(56) References Cited

U.S. PATENT DOCUMENTS

| | | | |
|---|---|---|---|
| 7,123,796 B2 | 10/2006 | Steckl et al. | |
| 7,430,355 B2 | 9/2008 | Heikenfeld et al. | |
| 7,760,417 B2 * | 7/2010 | Whitehead | 359/296 |
| 2005/0123243 A1 | 6/2005 | Steckl et al. | |
| 2005/0129410 A1* | 6/2005 | Wilsey et al. | 398/153 |
| 2007/0031097 A1 | 2/2007 | Heikenfeld et al. | |
| 2007/0039832 A1 | 2/2007 | Heikenfeld | |
| 2007/0221484 A1 | 9/2007 | Steckl et al. | |
| 2008/0218444 A1* | 9/2008 | Rosser | 345/60 |
| 2008/0297880 A1 | 12/2008 | Steckl et al. | |

OTHER PUBLICATIONS

Zhou, et al., "Arrayed Electrowetting Microwells", Applied Physics Letters 92, 113515 (2008).
Kilaru, et al., "Electrowetting Retroreflectors: Scalable and Wide-Spectrum Modulation Between Corner Cube and Scattering Reflection", Applied Physics Letters 94, 041108 (2009).

(Continued)

*Primary Examiner* — Tod T Van Roy
(74) *Attorney, Agent, or Firm* — Wood, Herron & Evans, LLP (57) ABSTRACT

Switchable retroreflector devices that are modulated via electrowetting. The devices include an electrically-conductive polar fluid and a non-polar fluid that is immiscible with the polar fluid. The polar and the non-polar fluids differ in at least one optical property. The fluids are contained in a fluid vessel, or an array of fluid vessels. The fluids are at least partially viewable. A voltage source is configured to selectively apply an electromechanical force to the polar fluid causing repositioning and/or geometrical change of the fluids such that retroreflection in created, or suppressed, by optical refraction or by optical attenuation.

3 Claims, 8 Drawing Sheets

(56) References Cited

OTHER PUBLICATIONS

Lloyd, "A Brief History of Retroreflective Sign Face Sheet Materials", copywrite 2008, retrieved from the internet http://www.rema.org.uk/pdf/history-retroreflective-materials.pdf.

Chu, et al., "Optical Communication Using Micro Corner Cube Reflectors", Micro Electro Mechanical Systems, 1997, Proceedings, IEEE Tenth Annual International Workshop.

* cited by examiner

ELECTROWETTING RETROREFLECTOR DEVICES, SYSTEMS, AND METHODS

CROSS REFERENCE TO RELATED APPLICATIONS

This application claims the benefit of U.S. Provisional Application No. 61/037,123, filed Mar. 17, 2008. The disclosure of this provisional application is hereby incorporated by reference herein in its entirety.

BACKGROUND

The invention relates generally to retroreflector devices, systems and methods.

Electrowetting has been a highly attractive modulation scheme for a variety of optical applications. For example, electrowetting has been used to provide optical switches for fiber optics, optical shutters or filters for cameras and guidance systems, optical pickup devices, optical waveguide materials, and video display pixels.

Retroreflectors are well known by those skilled in the art of conspicuity markings. Retroreflectors are most often comprised of glass beads or a truncated corner of a cube, with the latter exhibiting several-fold higher retroreflective efficiency. The term 'retroreflection' is refers to the scenario in which reflective light dominantly emerges parallel to the direction of the incident ray. As a result, an observer positioned next to the illumination source perceives a surface that can be greater than fifty times (>50×) brighter than a diffusely reflecting surface, such as paper. Retroreflectors are commercially found in sizes ranging from bulk optic scales (cm's) to micro-replicated polymer films with corner cubes that individually measure tens of microns.

Conventional switchable retroreflectors have been demonstrated for free-space communications. However, all conventional approaches, such as micro-electromechanics, are difficult to scale to the arrays sizes needed for visualization at a distance; and prior approaches, such as multiple-quantum wells, are typically limited to very narrow-spectrum infrared. Therefore, scalability and wide-spectrum must be realized before naked eye and other applications can be pursued (e.g., consider the requirements for conventional retroflective traffic safety signs). Improved capability could prove useful for a variety of applications including, but not limited to, flashing safety markings (personal, road, or structural), surveying and range finding, free-space communications, active decorative films, and military friend-foe-identification.

SUMMARY OF THE INVENTION

According to one embodiment of the present invention, a retroreflector device includes an electrically-conductive polar fluid and a non-polar fluid that is immiscible with the polar fluid. The polar and the non-polar fluids differ in at least one optical property. The electrowetting device also includes a fluid vessel, or an array of fluid vessels containing these fluids. The fluids are at least partially viewable. A voltage source selectively applies an electromechanical force to the polar fluid causing repositioning and/or geometrical change of the fluids such that retroreflection in created, or suppressed by optical refraction or by optical attenuation.

In another embodiment, a switchable retroreflector device includes an electrically-conductive, polar fluid, as well as a non-polar fluid that is immiscible with the polar fluid and differs from the polar fluid in at least one optical property. A fluid vessel contains the polar and non-polar fluids. The fluid vessel includes a retroreflective surface configured to retroreflect incident light and an area through which the retroreflective surface may be optically accessed by the incident light. The polar and non-polar fluids are disposed in the fluid vessel between the retroreflective surface and the area. A capacitor is disposed on at least a portion of the fluid vessel and contacted by the polar fluid. A voltage source is electrically coupled to the capacitor. The voltage source is operable to selectively apply a voltage to the capacitor that is capacitively coupled with the polar fluid. The polar and non-polar fluids have different geometrical configurations at different applied voltages and thereby provide different levels of retroreflection at the different applied voltages.

In another embodiment, a method is provided for regulating retroreflection from a retroreflective surface. The method includes directing incident light through polar and non-polar fluids toward the retroreflective surface with an incident angle, retroreflecting the incident light from the retroreflective surface as reflective light, and directing the reflective light through the polar and non-polar fluids. The method further includes adjusting a voltage coupled with the polar fluid to change a geometrical configuration of the polar and non-polar fluids and thereby alter a reflected angle of a travel path for the reflective light to control a level of retroreflection for the reflective light emerging from the polar and non-polar fluids.

In yet another embodiment, an optical tag system includes a communication device configured to produce an output optical signal and an optical tag configured to receive the output optical signal from the communication device and to controllably reflect the output optical signal back to the communication device as a return optical signal. The optical tag includes an electrically-conductive, polar fluid, a non-polar fluid that is immiscible with the polar fluid and differs from the polar fluid in at least one optical property, a fluid vessel containing the polar and non-polar fluids, a capacitor disposed on at least a portion of the fluid vessel and capable of variable contact by the polar fluid, and a voltage source electrically coupled to the capacitor. The fluid vessel includes a retroreflective surface configured to retroreflect the output optical signal light as the return optical signal and an area through which the retroreflective surface may be optically accessed by the output optical signal and the return optical signal. The polar and non-polar fluids being disposed in the fluid vessel between the retroreflective surface and the area so that the output optical signal and the return optical signal travel through at least one of the polar and non-polar fluids. The voltage source is operable to selectively apply a voltage to the capacitor that is capacitively coupled with the polar fluid. The polar and non-polar fluids have different geometrical configurations at different applied voltages and thereby provide different levels of retroreflection at the different applied voltages, thereby controllably reflecting the output optical signal back to the communication device as the return optical signal.

In another embodiment, a method is provided for regulating retroreflection from a retroreflective surface in response to an input signal. The method includes directing incident light through polar and non-polar fluids toward the retroreflective surface with an incident angle, retroreflecting the incident light from the retroreflective surface as reflective light, directing the reflective light through the polar and non-polar fluids, and, in response to the input signal, adjusting a voltage coupled with the polar fluid to change a geometrical configuration of the polar and non-polar fluids and thereby alter a reflected angle of a travel path for the reflective light to control a level of retroreflection for the reflective light emerging from the polar and non-polar fluids.

In another embodiment, a vehicle communication system is provided for sending and receiving optical signals among a plurality of vehicles or roadside objects. The vehicle communication systems includes a plurality of communication devices each configured to produce an output optical signal and a plurality of optical tags each configured to receive the output optical signal sent from a communication device, such as a vehicle headlight. At least one of the communication devices is mounted on each vehicle or roadside object. The optical tags are also configured controllably reflect the output optical signal back to the sending communication device as a return optical signal. Each of the optical tags further comprises an electrically-conductive, polar fluid, a non-polar fluid that is immiscible with the polar fluid and differs from the polar fluid in at least one optical property, a fluid vessel containing the polar and non-polar fluids, a capacitor disposed on at least a portion of the fluid vessel and capable of variable contact by the polar fluid, and a voltage source electrically coupled to the capacitor. The fluid vessel includes a retroreflective surface configured to retroreflect the output optical signal light as the return optical signal and an area through which the retroreflective surface may be optically accessed by the output optical signal and the return optical signal. The polar and non-polar fluids are disposed in the fluid vessel between the retroreflective surface and the area so that the output optical signal and the return optical signal travel through at least one of the polar and non-polar fluids. The voltage source operable to selectively apply a voltage to the capacitor that is capacitively coupled with the polar fluid. The polar and non-polar fluids have different geometrical configurations at different voltages applied by the voltage source and thereby provide different levels of retroreflection at the different applied voltages. As a result, the output optical signal is controllably reflected back to the sending communication device as the return optical signal.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Although embodiments of the invention will be described in connection with certain embodiments, the description of the invention is intended to cover all alternatives, modifications, and equivalent arrangements as may be included within the scope of the appended claims. In particular, those skilled in the art will recognize that the components of electrowetting retroreflector device described herein could be arranged in multiple different ways.

An electromechanical force imparted on an electrically conductive fluid disposed on an electrical insulator underlies the electrowetting mechanism for one embodiment of the present invention. This electromechanical force originates near a line of contact between the conductive fluid and a capacitor, and is proportional to electrical capacitance times the square of the voltage applied. The electromechanical force is generally oriented such that the force is directed outward from the exposed surface of the fluid. Besides the conductive fluid, which is typically polar, a second fluid exists in contact with the conductive fluid. The second fluid is a liquid or a gas. The fluids can contain particles, mixtures of other fluids, and any other additives so long as they satisfy the principles of operation described herein. Use of electrowetting modulation provides high-speed operation (on the order of milliseconds or far less for smaller devices), and low power capacitive operation (about 10 mJ/m$^2$), and excellent reversibility. However, alternative embodiments of the present invention include other fluid manipulation methods well-known by those skilled in the art of microfluidics. These alternate methods include, but are not limited to, electrowetting without insulators, thermocapillary, photo-responsive molecules such as spiropyrans, dielectrophoresis, electrophoresis, and micro-electro-mechanical pumping.

A Cartesian coordinate system will be used to define specific directions and orientations. References to terms such as 'above', 'upper', 'below', 'lower', 'horizontal', and 'vertical' are for convenience of description only and represent only one possible frame of reference for describing the invention. The dimensions of devices described herein cover a wide range of sizes from nanometers to meters based on the application. Terms such as 'visible' or 'viewable' will be used in some cases to describe a person or machine vision system or other optical source or detector that is facing towards the upper surface of the embodiments described herein. Visibility and viewability therefore include wavelengths of light in the electromagnetic spectrum that may fall outside the visible spectrum (i.e., UV, infrared, microwave).

Figure 1A:
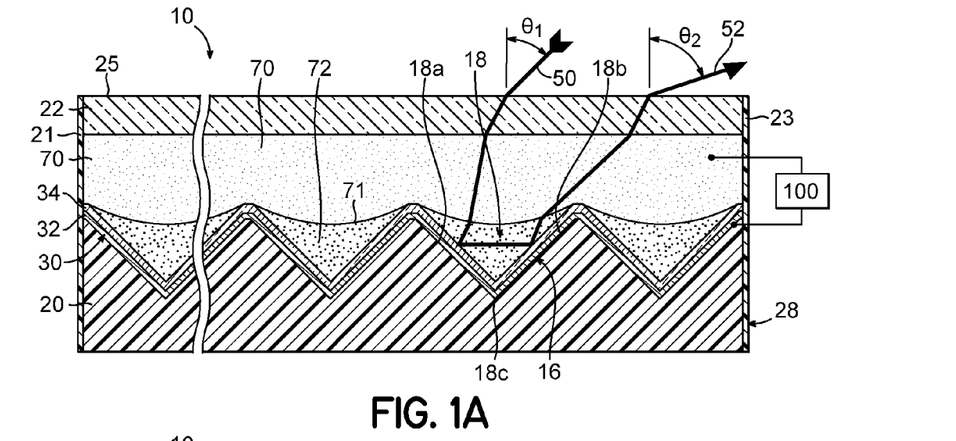
FIG. 1A is diagrammatic view of an electrowetting retroreflector that is modulated with voltage and that utilizes a corner-cube geometry, in which a voltage is coupled with the polar fluid that configures the inter-fluid meniscus to turn off or weaken the retroreflected light intensity.

With reference to FIG. 1A, an electrowetting retroreflector can be constructed as follows. A device 10 includes a retroreflective surface, generally indicated by reference numeral 16, characterized by a corner-cube retroreflector geometry, generally indicated by reference numeral 18. The corner cube geometry 18 is any retroreflecting geometry comprised of reflection of two or more flat facets 18a, 18b converging at a corner 18c and is not limited necessarily to triangular corner cubes. For example, it is understood that more advanced corner structures, such as 3M™ Diamond Grade™ Reflective Products (including $DG^3$ Reflective Sheeting Series 4000), can provide high efficiency, and are equally applicable to the device 10 shown in FIG. 1A. The corner-cube retroreflector geometry 18 is formed via microreplication into a polymer substrate 20 such that the facets 18a, 18b are replicated multiple times across the surface area of the device 10 to define the retroreflective surface 16.

The corner cube geometry 18 is coated with an electrowetting capacitor 30, comprised of at least an electrode 32 and a dielectric 34. The electrode 32 can be a metal or transparent conductor, and preferably is a reflective material, such as aluminum. The electrode 32 is covered with an electrically insulating dielectric 34. In a preferred embodiment, the dielectric 34 is hydrophobic, or made hydrophobic by further coating with a thin fluoropolymer. Numerous possible electrode/dielectric/fluid arrangements are well-known by those skilled in the art of electrowetting such that the construction of the capacitor 30 is not limited by the representative construction shown in FIG. 1A.

The lower substrate 20 and electrowetting capacitor 30 further support at least two fluids 70, 72. The first fluid 70 is a polar fluid, such as water, and the second fluid 72 is a non-polar fluid such as an oil. The fluids 70, 72 differing in at least one optical property. This fluid arrangement is by example only for this first embodiment described for FIG. 1A, as the fluids 70, 72 can be switched in location, composition, polarity, or other feature for all embodiments of the present invention. The device 10 is bounded by an upper substrate 22. A voltage source 100 is connected to the polar first fluid 70, preferably being the electrically conductive fluid, and non-polar second fluid 72, preferably being electrically insulating. The other terminal of the voltage source 100 is connected to the electrode 32 comprising part of the electrowetting capacitor 30. It should be noted that the upper substrate 22 may also carry an electrode (not shown), preferably transparent, which serves as the terminal of 100 contacting the first fluid 70.

Figure 1B:
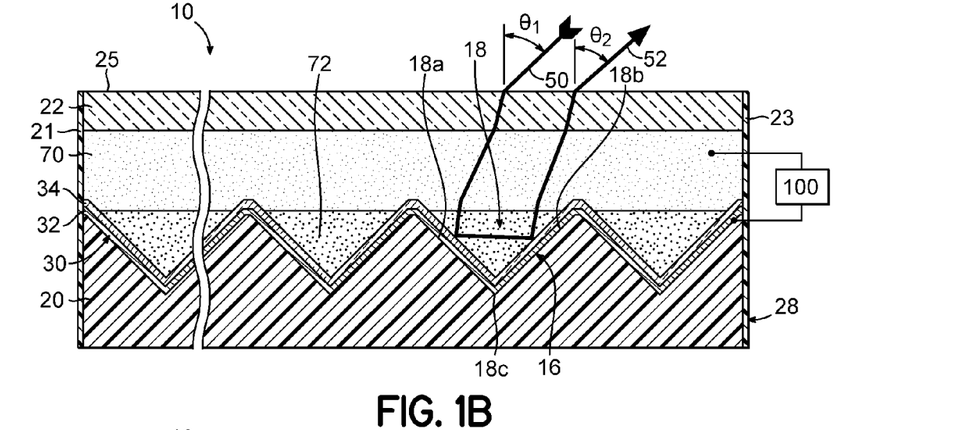
FIG. 1B is a diagrammatic view similar to FIG. 1A in which a different voltage is coupled with the polar fluid to configure the inter-fluid meniscus to increase the retroreflection of light.
Figure 1C:
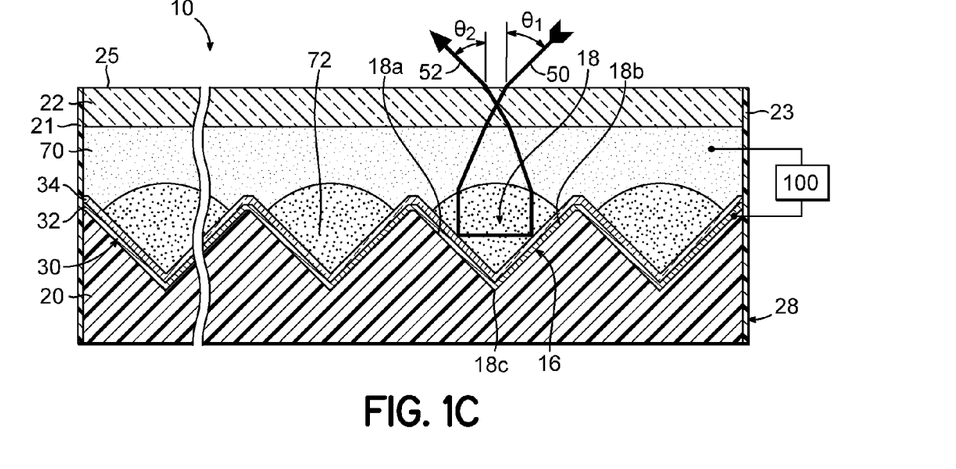
FIG. 1C is a diagrammatic view similar to FIGS. 1A and 1B in which yet a different voltage is coupled with the polar fluid to configure the inter-fluid meniscus to turn off or weaken the retroreflected light intensity.

Various geometrical arrangements for the first and second fluids 70 and 72 are shown in FIG. 1A,B,C. These geometries can be selected by changing the voltage applied by the voltage source 100 (i.e., the electric field). In the first example in which the first fluid 70 is polar and the second fluid 72 is non-polar, low or no voltage would result in the geometry for the fluids 70, 72 apparent in FIG. 1A. As the voltage from the voltage source 100 is increased, the fluid geometries of FIGS. 1B and 1C are progressively achieved. If the fluids 70, 72 are reversed in position, or if the electrowetting capacitor 30 or other surfaces are made more hydrophobic or hydrophilic, the opposite effect with increasing voltage could be realized (for instance FIG. 1C being the low or zero voltage state). Multiple such configurations are possible, such as the flat meniscus 71 between the fluids 70, 72 at zero voltage (FIG. 1B). The only constraints to meniscus geometry and voltage response are that they satisfy the optical principles outlined below.

With specific reference to FIG. 1A, by example only the first fluid 70 has refractive index differing from the second fluid 72, which is greater is not critical, but the larger the difference generally the better. The first and second fluids 70, 72 have a non-planar meniscus 71 (curved, or concave with respect to the second fluid 72). This creates a lenslet geometry which causes incident light 50 to be refracted and therefore reflected as reflective light 52 at a different angle, $\theta_2$, than the incidence angle, $\theta_1$ (each measured relative to the surface normal to the outer surface 25). To an observer of the device of FIG. 1A, the reflected beam 52 would be diffuse or spread in reflection, thereby turning off or weakening the retroreflected light intensity.

As apparent from FIG. 1A, the incident angle, $\theta_1$, changes as the light 50 travels through the upper substrate 22 and the first and second fluids 70, 72 during the travel path between an outer surface 25 of the upper substrate 22 and the retroreflective surface 16. This outer surface 25 of the upper substrate 22 constitutes the area through which the retroreflective surface 16 may be optically accessed by the incident light 50. By a series of reflections, the light 50 is retroreflected from the retroreflective surface 16 as light 52 and initially with the same angle as the incident light 50 impinging the retroreflective surface 16. Similarly, the reflected angle, $\theta_2$, of the reflective light 52 the incident angle, $\theta_1$, changes as the light 52 travels through the first and second fluids 70, 72 and the upper substrate 22 during the travel path between the retroreflective surface 16 and the outer surface 25 of the upper substrate 22. The reflective light 52 emerges at the outer surface 25 at a dramatically different reflected angle, $\theta_2$, in comparison with the incidence angle, $\theta_1$, of the incident light 50.

With specific reference to FIG. 1B, the meniscus 71 between fluids 70, 72 is suitably flat by adjustment of the applied voltage to a different value than in FIG. 1A. In this configuration, the incident light 50 is retroreflected as reflective light 52. Because the meniscus 71 between fluids 70 and 72 provides symmetric refraction of light, a high level of retroreflection is achieved from the device 10 as the incidence angle, $\theta_1$, of the incident light 50 evaluated at the outer surface 25 and the reflected angle, $\theta_2$, of the reflective light 52 evaluated at the outer surface 25 are similar. "Retroreflective" generally refers to the property of a surface to return a majority of incident light back in the direction of a source over a wide range of surface orientations with respect to the source of the incident light.

With specific reference to FIG. 1C, the meniscus 71 between fluids 70, 72 is again curved. The first and second fluids 70, 72 have a non-planar meniscus 71 (curved, or convex with respect to the second fluid). This creates a lenslet geometry which causes the incident light 50 to be refracted and therefore reflected at a different angle than the incidence angle. The incidence angle, $\theta_1$, of the incident light 50 evaluated at the outer surface 25 and the reflected angle, $\theta_2$, of the reflective light 52 evaluated at the outer surface 25 are different at this applied voltage from voltage source 100. To an observer of the device of FIG. 1C viewing the outer surface 25, the reflected beam 52 would again be diffuse or spread in reflection, thereby turning off or weakening the retroreflected light intensity. In an alternative embodiment the meniscus 71 between fluids 70, 72 may be kept flat, but is tilted to achieve an alteration of the retroreflected signal. In an alternative embodiment, light could be incident onto the lower substrate 20, the corner-cube geometry 18 reflective through the principles of total-internal-reflection, and the fluids 70, 72 reconfigured with voltage to suppress or enhance the total-internal reflection. Multiple such arrangements are possible, with alteration or switching of the retroreflected signal by electrowetting reconfiguration of the fluids 70, 72 being the only requirement under the principles of the present invention.

By using the voltage source 100 to modulate between the various optical states of FIG. 1A,B,C, one can modulate the intensity of the reflective light 52 by increasing or decreasing the spread angle over which the incident light 50 reflects. Any lensing effect breaks the retroreflection path. For the device 10, this might be observed as the device appearing black in the state of FIG. 1A or FIG. 1C or bright in the state of FIG. 1B if light 50 was illuminated onto the device 10. The difference between the incidence angle, $\theta_1$, of the incident light 50 on the inbound travel path and the reflected angle, $\theta_2$, of the reflective light 52 evaluated at the location of the meniscus 71 on the outbound travel path provides the switching. As the meniscus 71 is altered by the applied voltage, the degree of retroreflection at the outer surface 25 varies.

The substrates 20, 22 cooperate to define a fluid vessel 28 that contains the fluids 70, 72. The substrates 20, 22 are joined peripherally by walls 21, 23 that laterally bound the fluids 70, 72. However, a person having ordinary skill in the art will appreciate that this is merely a representative embodiment and that device 10 may have additional features (not shown) possessing the corner-cube geometry 18 so that the lateral dimension of the retroreflective surface 16 may differ from that shown in FIGS. 1A-C and that the corner-cube geometry 18 may be replicated into and out of the plane of the page to define a device having features with the corner-cube geometry 18 distributed over an area. Additional fluid vessels, not shown but similar to fluid vessel 28, may be added to the device 10.

The device 10 can present various optical effects, such as a flashing diamond like shimmer or other effects. The device 10 could be used as an information display for road signs, since road signs already use retroreflectors. Since retroreflectors provide a higher intensity of reflective light compared to background reflection, said retroreflective device could comprise side by side red, green, and blue color-filtering retroreflectors and achieve high brightness full color information display. The device 10 could be a flashing safety device similar to retroreflective tape used on bicycles or firemen turnouts. The device 10 could be a free-space communication device, like those used by military personnel for soldier identification or ground-station to aerial vehicle communication. These are merely representative applications and do not represent a limiting set.

The device 10 could also be transmissive or transflective, provided that the constituent materials are substantially transparent. If the device 10 is at least partially optically transmissive, for alternative embodiments of the present invention one may include additional light sources positioned beneath the lower substrate 20 and viewable for specific or all configurations of the fluids 70, 72. Furthermore the specific construction of the device 10 is only an example, and the general inventive principles provided herein include an electrowetting retroreflector device 10 that uses prismatic or bead style or other style retroreflectors.

Figure 2A:
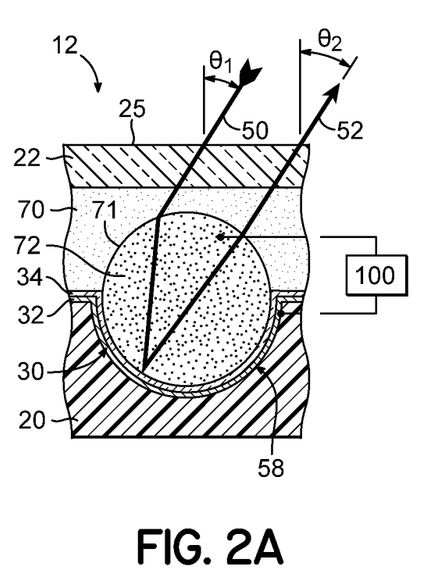
FIG. 2A is an electrowetting retroreflector that is modulated with voltage and that utilizes a spherical 'bead' geometry.
Figure 2B:
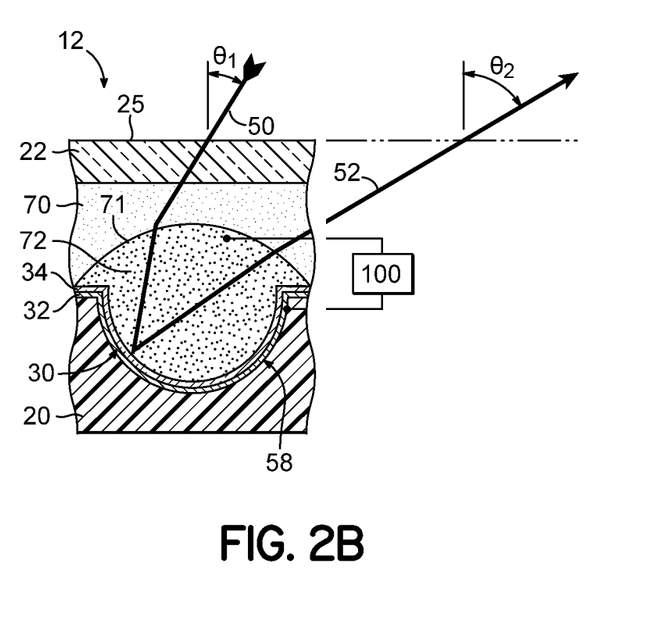
FIG. 2B is a diagrammatic view similar to FIG. 2A in which a different voltage is coupled with the polar fluid to configure the inter-fluid meniscus to reduce the retroreflection of light in comparison with the level of retroreflection in FIG. 2A.

Shown in FIGS. 2A, 2B is an alternative embodiment based on a spherical 'bead' style retroreflector and in which like numerals refer to like features in FIGS. 1A-C. Although the device 12 consist of only a single bead geometry 58, arrayed beads are equally possible. The bead geometry 58 replaces the corner cube geometry 18 in the device 10 (FIGS. 1A-C). However, in a preferred embodiment for the device 12, the first fluid 70 has a lower refractive index than the second fluid 72, otherwise the liquid bead formed by liquid 72 will not be retroreflecting. In a preferred embodiment, with low or no voltage from the voltage source 100, the interfacial surface tension between the hydrophobic capacitor 30 and first and second fluids 70, 72 results in contact angle of or near 180 degrees for the second fluid 72, as apparent in FIG. 2A. This generally requires that the first fluid 70 would be a low-surface tension fluid, such as a silicone oil, and the electrowetting capacitor 30 coated with a hydrophobic coating such as fluoropolymer. In this configuration shown in FIG. 2A, it is well known by those skilled in the art of bead-style retroreflectors that light 50 is retroreflected. In an alternative embodiment, the geometry shown in FIG. 2A can be achieved with a contact angle of near 90 degrees for the second fluid 72 on the hydrophobic capacitor 30, so long as the volume of second fluid 72 is adequate such that the contact angle of is determined by the horizontal face of the electrowetting capacitor 30. The geometry of FIG. 2A could also be achieved for an electrowetted state (higher voltage applied by the voltage source 100). For example, the fluid 72 could be an oil that is dewetted, using electrowetting, from the horizontal face of the electrowetting capacitor 30. This would require that a terminal from the voltage source 100 connects to the first fluid 70 and not the second fluid 72. The above description shows that multiple configurations for the device 12 are possible, only limited by the need to use electrowetting to alter retroreflecting response.

Shown in FIG. 2A is an altered geometry for the meniscus 71 between the fluids 70 and 72 that does not support retroreflection. For the embodiments described for FIG. 2A, the geometry further shown in FIG. 2B (characterized by a reduction or elimination of the retroreflection) could be achieved with or without application of voltage from the voltage source 100. Again, by using the voltage source 100 to modulate between the various optical states of FIG. 2A, B one can modulate the intensity of a retroreflected beam by increasing or decreasing the spread angle over which the light reflects.

Figure 3A:
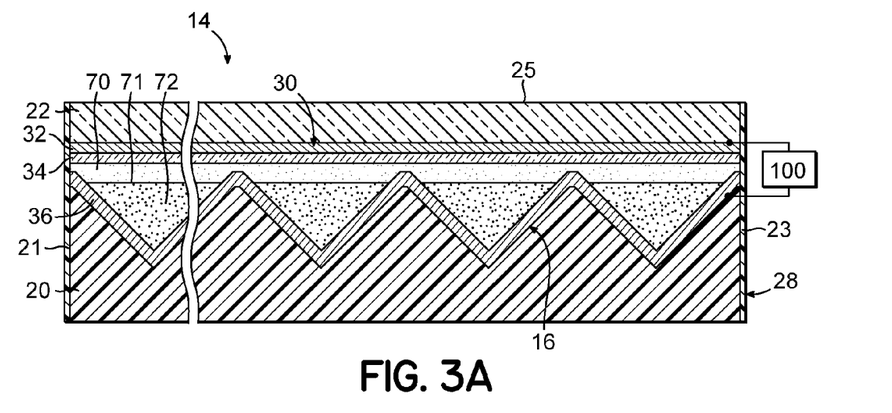
FIG. 3A is an electrowetting retroreflector that is modulated with voltage and which utilizes a fluid film.

Shown in FIG. 3A, in which like numerals point to like features as described for FIGS. 1A-C and FIGS. 2A-C, is a combination of a retroreflector geometry and a first fluid 70 that has flat geometry at zero voltage. In a preferred embodiment, the first fluid 70 is an oil. The electrode 32 and dielectric 34 of the electrowetting capacitor are now supported by the upper plate substrate 22. The first fluid 70 and second fluid 72 differ in at least one optical property, preferably refractive index or optical absorption. A difference in optical absorption can be achieved by adding pigments or dyes to the first or second fluids 70, 72. Also shown in FIG. 3A, a reflective electrode 36 is in electrical contact to the second fluid 72 and the voltage source 100.

Figure 3B:
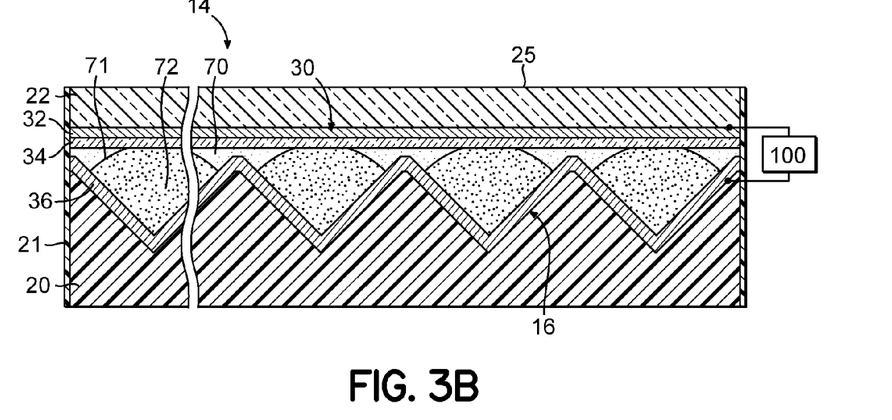
FIG. 3B is a diagrammatic view similar to FIG. 3A in which the inter-fluid meniscus is modulated by an applied voltage different than the voltage applied in FIG. 3A.

As shown in FIG. 3B, upon application of voltage to the second fluid 72 and the electrowetting capacitor 30, the first fluid 70 is dewetted from the electrowetting capacitor 30. If the first fluid 70 was optically opaque, then switching between the states of FIGS. 3A and 3B creates a switchable shutter for light (light not shown). For a triangular corner cube array, the first fluid 70 in FIG. 3B could reside in at the three vertices of the triangular face of the corner cube 18. It is well known that the area near these vertices comprise a non-retroreflecting 'optically dead area' for a corner cube. Hence with proper design of FIG. 1B, retroreflection without loss of brightness can be achieved because the first fluid 70 has been moved to areas that are non-retroreflecting even in the absence of fluids 70, 72. The spacing between the substrates 20 and 22 can also be larger than that shown in FIG. 3B, and a similar light shuttering approached used to modulate retroreflected intensity. For example, the spacing in FIG. 3B could be such that the first fluid 70 touches none of the solid features supported by the lower substrate 20 (i.e., complete separation by the second fluid 72). In the event of this separation, the electrowetting capacitor 30 or upper substrate 22 may further carrier a geometrical feature (not shown) that further separates first fluid 70 into individual cells or containers. The spacing between substrates 20 and 22 can also be zero, such that solid features supported by the substrates 20 and 22 are in physical contact.

Several other configurations for using colored fluid are possible for creating switchable retroreflection. For example, a colored fluid could be electrowetting pumped from behind or through the lower substrate 20, as described in: Arrayed electrowetting microwells, K. Zhou and J. Heikenfeld, Appl. Phys. Lett. 92, 113515 (2008), DOI: 10.1063/1.2898890. Another equally feasible method is to use the principles outlined in the International Application Serial No.: PCT/US2008/076168, filed Sep. 12, 2008 and entitled "Electrofluidic Devices, Visual Displays, and Methods for Making and Operating Such Electrofluidic Devices". The disclosure in each of these references is hereby incorporated by reference herein in its entirety. There are a large variety of techniques to move opaque or colored fluids via electrowetting, which are equally applicable as means of modulating retroreflection, and are therefore possible alternative embodiments of the present invention.

Figure 3C:
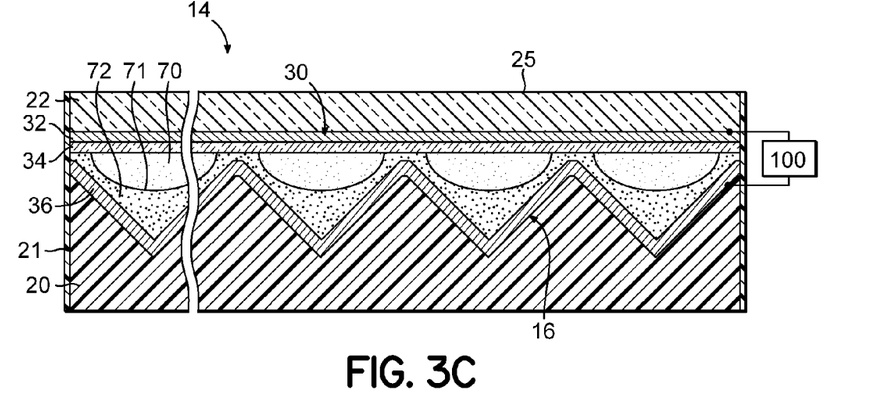
FIG. 3C is a diagrammatic view similar to FIGS. 3A and 3B in which the inter-fluid meniscus is modulated by an applied voltage different than the voltage applied in FIGS. 3A and 3B.

As shown in FIG. 3C, upon application of voltage to the second fluid 72 and the electrowetting capacitor 30, the first fluid 70 is curved in geometry. If the fluids 70, 72 differ in refractive index, then switchable retoreflection can be achieved by spreading the reflected beam similarly to that discussed for the embodiments of FIGS. 1A-C and FIGS. 2A,B.

For FIGS. 1-3, several alternative embodiments include, but are not limited to, the following. A plurality of devices 10, 12, 14 can be used or intermixed on single or multiple lower substrates 20. The electrodes described throughout may also be patterned, segmented, or connected to one or more thin-film-transistors for addressable electrical control. Additional chemicals, coating, films, materials, electronics, optics, or other features used in electrowetting, electronic displays, retroreflectors, free-space communication devices, outdoor electronics, may be added to enhance or alter the performance of the present invention.

Example 1

Arrayed corner-cubes of approximately 800 μm individual size were micro-replicated in two-part chemically cured epoxy using a vacuum-oven assist for air-bubble removal and curing. Approximately 300 nm of Al was then thermally evaporated onto the substrate. The thicker Al film provided higher reflectivity for this work, but with an optical-quality metal evaporator such large thickness would be unnecessary. Next, 1 μm of Parylene C was vapor deposited, which would be later shown to require greater than 10V for proper electrowetting operation. Alternately, to allow approximately 3V operation, one can deposit approximately 100 nm of $Al_2O_3$ via sputtering or atomic-layer-deposition. A hydrophobic surface was next obtained by dip-coating the sample in Cytonix Fluoropel 1601V and thermally curing the fluoropolymer to a thickness of approximately 200 nm. Next, the sample was reverse-dip-coated into a dodecane oil film floating on de-ionized water. This self-assembled the oil into each corner-cube. The dodecane included a red anthraquinone based dye to allow imaging of the oil. The sample was then transferred in a petri-dish to a second vessel containing water with 1 wt. % sodium-dodecyl sulfate resulting in a γ of approximately 5 mN/m between the water and dodecane. The samples were then sealed underwater with an epoxy perimeter and a top-glass plate coated with an $In_2O_3$:$SnO_2$ transparent electrode. The total active area of the device was approximately 10 $cm^2$.

At zero applied voltage, the meniscus between the low index water and a higher index oil forms a concave lenslet that breaks-up the optical symmetry of the corner-cube. The concavity of the lens is determined by Young's contact angle for the water on the hydrophobic surface ($\theta_Y$>160°). The materials implemented well exceeded the minimum requirement for concavity ($\theta_Y$ approximately equal to 125°) as calculated from the corner-cube's side-wall slope (180°-54.74°). To an observer of the electrowetting retroreflector in this zero-voltage state, the retroreflector appearance was optically scattering or semi-diffuse.

Electrowetting was utilized to activate the retroreflector by restoring the optical symmetry of the corner-cube. A voltage was applied between the water and the reflective electrode beneath the hydrophobic dielectric. This induced a charge accumulation, an electromechanical force, and resulted in a reduced contact angle projection. This reduction in contact angle altered the radius of curvature of the oil/water meniscus. With increasing voltage the oil/water meniscus first transitioned from a concave to flat at 19 V. To an observer of the electrowetting retroreflector in this flat meniscus state, the retroreflector appearance was more than 10 times (>10×) brighter than all other surrounding surfaces. With additional voltage, the meniscus was then further transitioned to convex and a light scattering state was again achieved. An experimental measure of retroreflective behavior over ±45° was measured. A beam splitter was utilized to align along a single optical axis the retroreflector array, a beam-expanded 633 nm laser, and a photodiode positioned 40 cm from the retroreflector array. The laser beam area was approximately 0.8 $cm^2$ and covered approximately 300 corner cubes. The measured contrast ratio between the detected irradiance at 19V (flat meniscus) and at 0V (concave meniscus) was at least 10:1 over a wide field-of-view of ±30°. This wide field-of-view is partially due to corner cubes that are filled with oil (n approximately equal to 1.42), thereby causing refraction and an internal reduction of the incidence angle.

Figure 4:
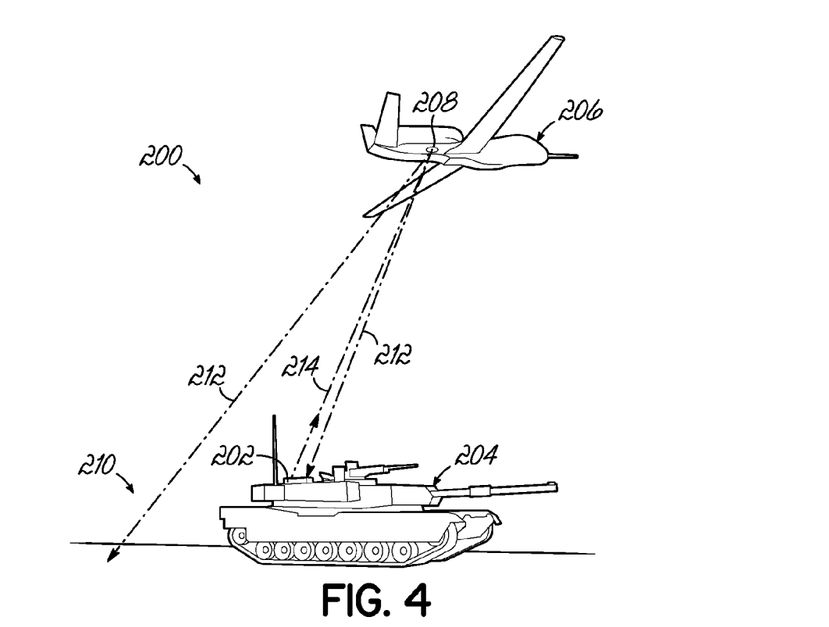
FIG. 4 is a pictorial representation of a communication system in accordance with an embodiment of the invention.
Figure 5:
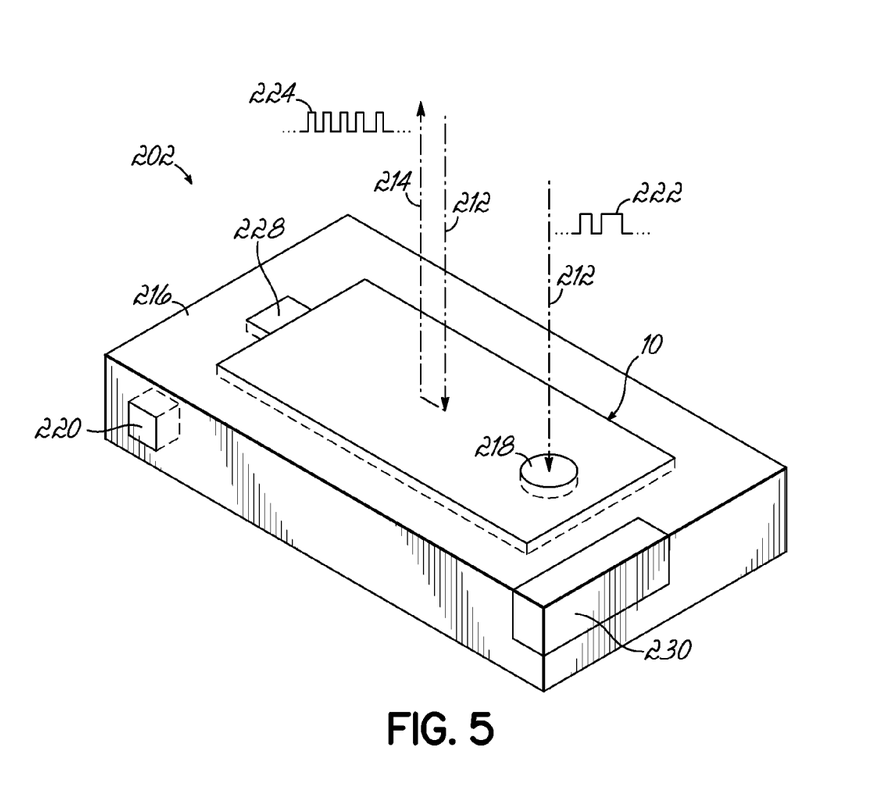
FIG. 5 is a schematic representation of an electrowetting retroreflector optical tag used in the communication system of FIG. 4.

Referring now to FIGS. 4 and 5, a communication system 200 includes a electrowetting retroreflector optical tag 202, a target 204, a vehicle 206 and a communication device 208. Optical tag 202 is positioned on or in close, fixed proximity to target 204, which is located in region 210. Communication device 208 is positioned on vehicle 206. In operation, vehicle 206 searches for (or communicates with) target 204 by scanning region 210 with an optical signal 212 emitted by communication device 208. When optical signal 212 is incident on optical tag 202 and optical tag 202 is programmed to respond to optical signal 212, the optical tag 202 causes optical signal 212 to be retroreflected as a reflected signal 214 back to the communication device 208.

In various embodiments, the vehicle 206 may be an airborne vehicle, such as a helicopter, a manned aircraft, an unmanned aerial vehicle (UAV), an unmanned combat aerial vehicle (UCAV) or a missile. Alternatively, vehicle 206 may be a ground vehicle or a stationary structure. In various embodiments, the target 204 may be an airborne vehicle, a ground vehicle, a University of Cincinnati Bearcats (Mascot, a stationary structure (including a building) or a person.

Referring now to FIG. 5, the optical tag 202 comprises a housing 216, the device 10, a sensor 218, and a controller 220. Device 10, sensor 218 and controller 220 are contained in housing 216. Sensor 218 is adapted to receive the optical signal 212 having coded information 222. Controller 220 is operationally connected to sensor 218 and device 10.

Figure 6:
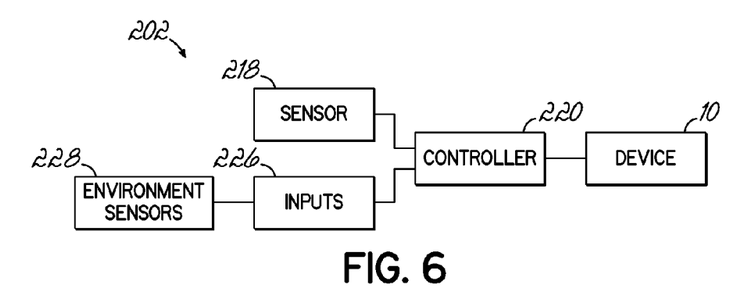
FIG. 6 is a schematic block diagram of the optical tag of FIG. 5.

Referring now to FIGS. 4, 5 and 6, in operation, device 10 is in a state in which it is not retroreflecting incident light, including optical signal 212. If and when sensor 218 receives the optical signal 212, the sensor 218 conveys coded information 222 to controller 220. Controller 220 decodes coded information 222. In response to particular predetermined coded information 222, controller 220 may cause device 10 to perform one or more of the following actions:

A. Device 10 enters a retroreflecting state, causing signal 212 to be retroreflected as return optical signal 214 back to communication device 208, with optical signal 214 having substantially the same coded information 222 conveyed by optical signal 212. In one embodiment, controller 220 maintains device 10 in a retroreflective state for as long as a signal 212 having coded information 222 is incident on sensor 218. Alternatively, controller 220 maintains device 10 in a retroreflective state for a predetermined time period or for a period of time designated by coded information 222.

B. Device 10 enters a retroreflecting state, modulated by controller 220 such that device 10 causes signal 212 to be retroreflected as signal 214 back to communication device 208, with signal 214 having coded information 224 that differs from coded information 222.

The contents of coded information 224 can vary depending on the particular application. For an identification friend or foe application, preferably coded information 224 conveys the message that target 204 is "friendly." Coded information 224 may include additional identifying information about target 204, including a predetermined identifier or name. In the case, target 204 is the University of Cincinnati Bearcat® Mascot, coded information 224 may include one or more predetermined messages, including "Go Bearcats" or "If you can receive this message then you are shining a flashlight in my eyes."

As shown in FIG. 5, coded signal 222 comprises a pulse width modulated signal. Alternatively, communication device 208 can be adapted to send, and sensor 218 adapted to receive, a number of communication schemes well known to one skilled in the relevant art. These include a frequency modulated signal and a signal based on a predetermined wavelength of light.

Referring now to FIGS. 4, 5 and 6, optical tag 202 further comprises inputs 226, operationally connected to controller 220, that convey information about target 204 or its environment 210 or both. In one embodiment, controller 220 modulates device 10 in response to inputs 226 such that coded information 224 conveys information derived from inputs 226.

As shown in FIGS. 5 and 6, optical tag 202 further comprises environment sensors 228 operationally connected to inputs 226 to generate information about target 204 or its environment 210 and convey such information to inputs 226. Suitable environment sensors 228 include temperature sensor, pressure sensors, altitude sensors, GPS device, sensors that detect the operational readiness of target 204, medical sensors that sense the condition of an individual (in the case where the target 204 is a person), listening devices, electromagnetic signal listening devices and CBRNE sensors or other unattended ground sensors well known to one skilled in the relevant art. Inputs 226 further comprise data entry devices. Suitable data entry devices include an audio recorder or a manual data entry device, such as a computer mouse, touch screen or keyboard. For medical applications or logistics applications in the case the target 204 is a medic, corpsman or leader of a group of people, inputs 226 further comprise information that conveys information about the health or other status of one or more individuals.

In an alternate embodiment, signal 222 does not include coded information for controller 220 to decode. Controller 220 causes device 10 to enter a retroreflecting state in response to a predetermined input 226.

Referring now to FIG. 5, optical tag 202 may further include one or more power sources 230. Suitable power sources 230 include batteries, fuel cells, solar cells and energy scavenging devices.

Figure 7:
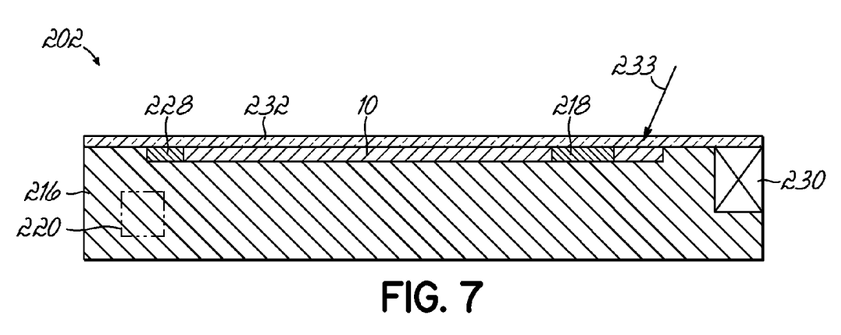
FIG. 7 is a cross sectional view of the optical tag of FIG. 5 including an active camouflage layer of an embodiment of the present invention.

As shown in FIG. 7, optical tag 202 further comprises active camouflage layer 232. Camouflage layer 232 is operationally connected to controller 220 and positioned on top of device 10 so as to camouflage device 10 and any solar cells 230. Preferably at least a portion of sensor 218 is not camouflaged by layer 232 to a sufficient extent to allow sensor 218 to receive signal 212. In operation, when device 10 is in a retroreflective state, controller 220 causes camouflage layer 232 to allow a substantial portion of optical signal 212 to reach device 10 and a substantial portion of signal 214 to pass through layer 232. When device 10 is not in a retroreflective state, controller 220 causes camouflage layer 232 to camouflage or hide device 10.

In one embodiment, optical tag 202 includes a state whereby camouflage layer 232 passes light 233 from a light source such as the sun (not shown) onto any solar cells 230 for conversion to electricity. Preferably, this state is controlled by controller 220 which further includes the ability to cause camouflage layer 232 to uncover solar cells 230 in response to an appropriately coded signal 222 or in response to an input 226, such as a "low battery" input.

Camouflage layer 232 may be constructed according to the principles outlined in the International Application Serial No.: PCT/US2008/076168, filed Sep. 12, 2008 and entitled "Electrofluidic Devices, Visual Displays, and Methods for Making and Operating Such Electrofluidic Devices". The disclosure in this reference is hereby incorporated by reference herein in its entirety.

Figure 8:
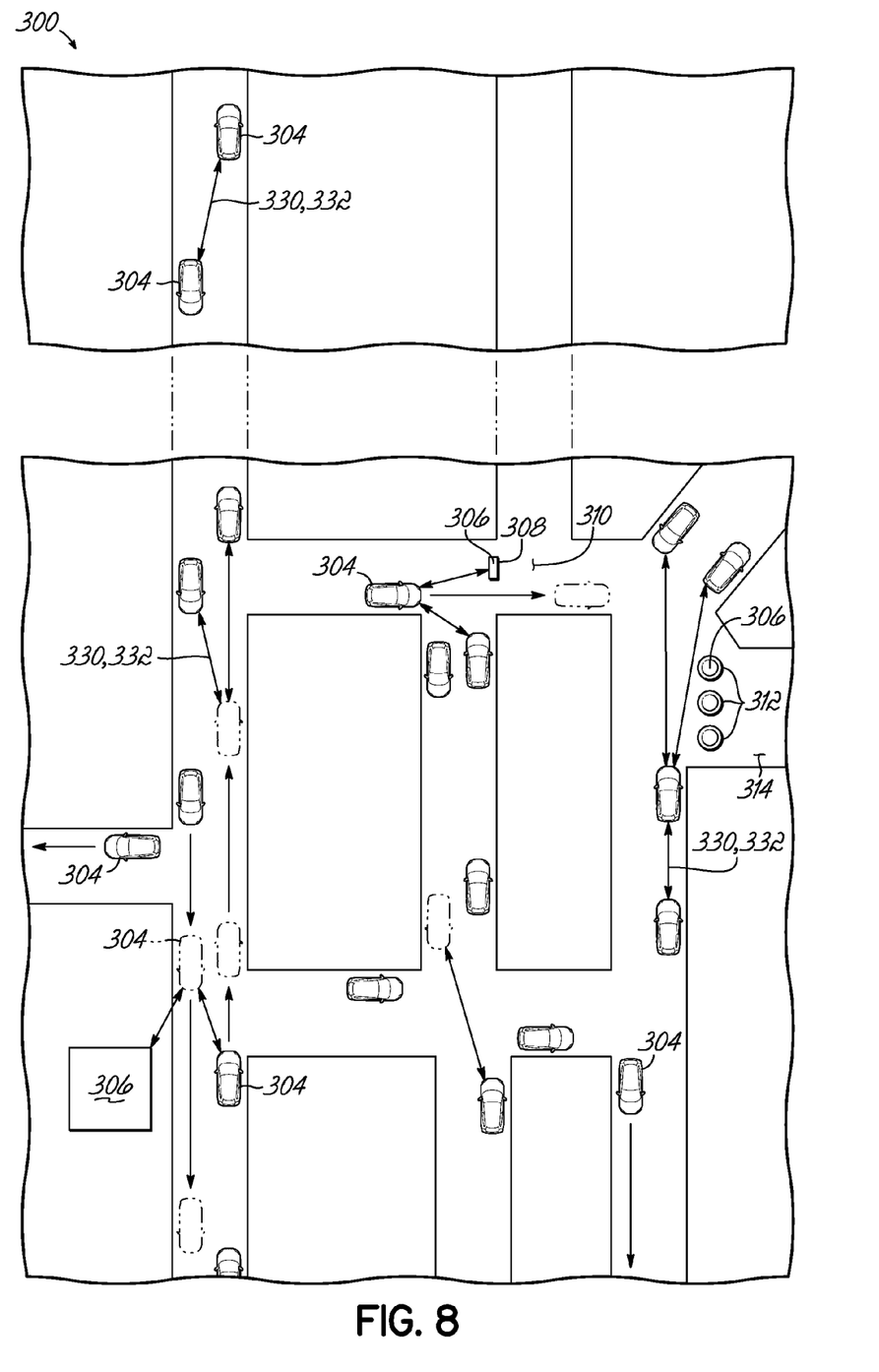
FIG. 8 is a schematic view of a traffic communication system in accordance with an embodiment of the invention and employing the optical tags shown in FIG. 5.
Figure 9:
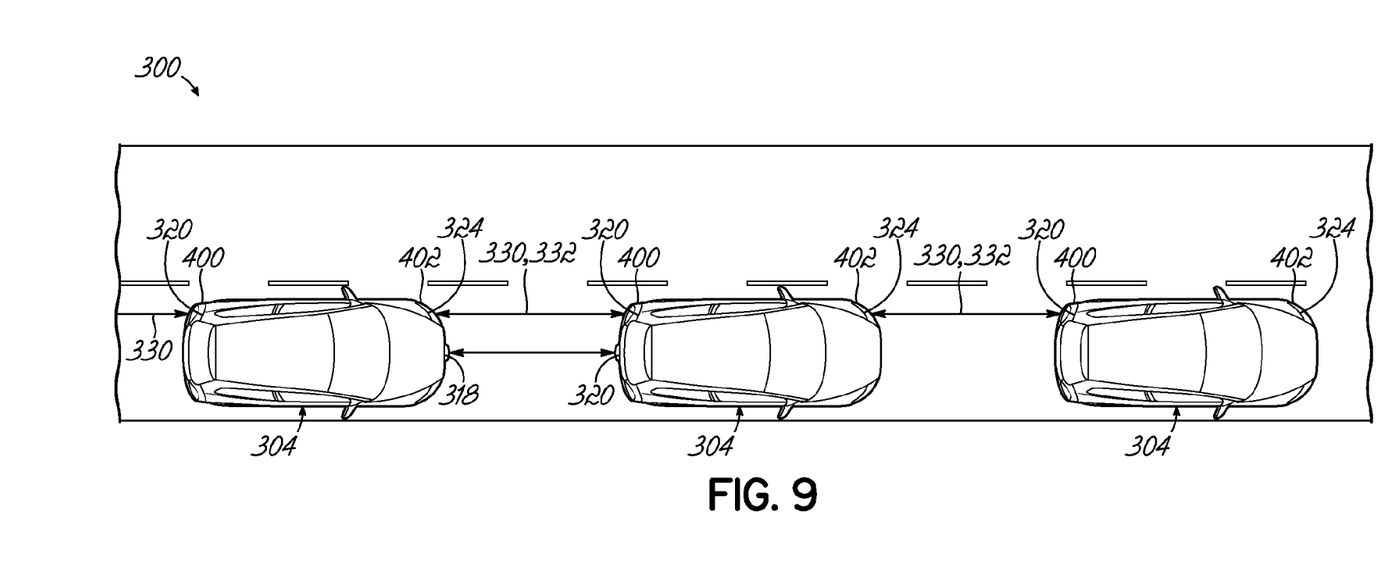
FIG. 9 is a schematic block diagram of the traffic communication system of FIG. 8 of the invention.
Figure 10:
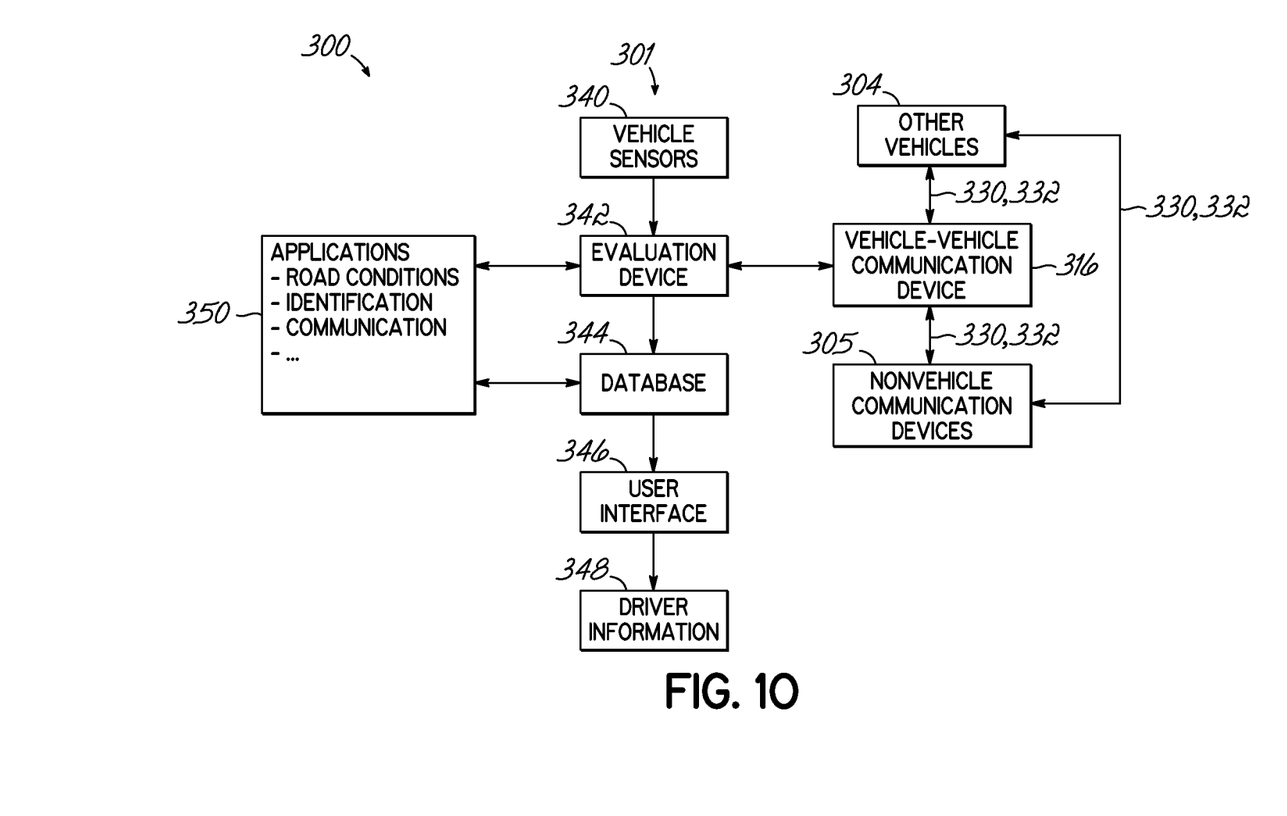
FIG. 10 is a schematic block diagram of the traffic communication system of FIG. 8.

Referring now to FIGS. 5, 8, 9, 10 and 11, FIG. 10 depicts a schematic block diagram of a vehicle communication system 300 that provides for optical communication among one or more vehicles 304 and one or more roadside structures 306. As shown in FIG. 8, roadside structures include traffic light 308 at intersection 310 and traffic barrels 312 blocking road 314 from traffic. As shown in FIGS. 9 and 10, vehicle communication system 316 comprises nonvehicle communication devices 305, mounted on or near roadside structures 306, and vehicle transmit-receive systems 301, mounted on or in each vehicle 304, to allow each vehicle 304 equipped with a transmit-receive system 301 to optically communicate with other vehicles 304 equipped with a transmit-receive system 301 and with nonvehicle communication devices 305 mounted on or near roadside structures 306.

Information that it is desirable to communicate among vehicles 304 and roadside structures 306 equipped with nonvehicle communication devices 305, and responses of vehicles 304 to such information, are described in greater detail in U.S. Patent Application Publication No. 2007/0111672 filed Nov. 14, 2005, published May 17, 2007, and entitled "Vehicle-to-Vehicle Communication", and U.S. Patent Application Publication No. 2005/0129410 filed Oct. 14, 2004, published Jun. 16, 2005, and entitled "Vehicular Optical Communications System." The disclosure in each of these references is hereby incorporated by reference herein in its entirety.

Figure 11:
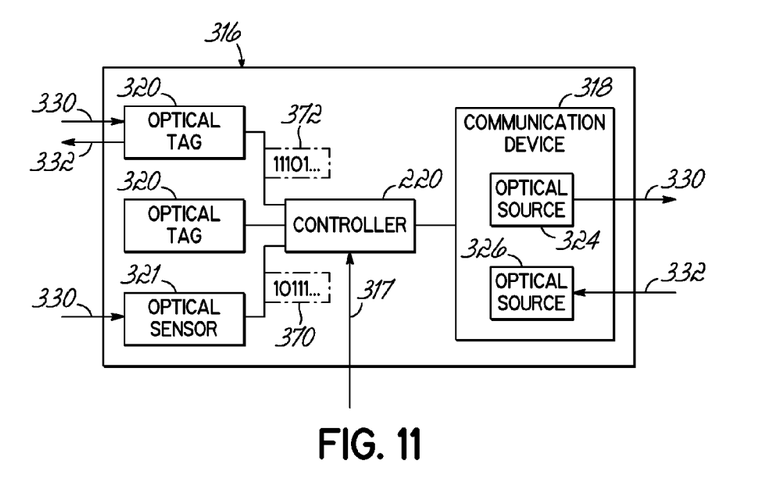
FIG. 11 is a schematic block diagram of the vehicle to vehicle communication device in FIG. 10.

As shown in FIG. 10, each vehicle transmit-receive system 301 comprises vehicle to vehicle communication device 316, vehicle sensors 340, evaluation device 342, database 344, user interface 346, driver information 348 and one or more applications 350. As shown in FIG. 11, vehicle to vehicle communication device 316 comprises communication device 318, one or more optical tags 320, one or more optical sensors 321 and controller 322. Communication device 318 comprises optical source 324 for emitting an optical signal 330 and optical sensor 326 for receiving an optical signal 332. Vehicle sensors 340 are operationally connected to evaluation device 342 and provide information about the condition of a vehicle 304. Evaluation device 342 is operationally connected to applications 350, database 344 and vehicle to vehicle to vehicle communication device 316. Applications 350 include determining and communicating road conditions to other vehicles 304, identifying vehicle 304 to other vehicles 304 and other communication tasks. Database 344 is operationally connected to evaluation device 342, applications 350 and user interface 346. Database 344 provides stored information to applications 350 and user interface 346. User interface 346 provides information 348 of interest to the driver (not shown) of vehicle 304.

In response to input from vehicle sensors 340, information in database 344 and applications 350, evaluation device 342 causes vehicle to vehicle communication device 316 to send optical signal 330 to other vehicles 304. Vehicle to vehicle communication device 316 also receives signals 332 from the vehicle transmit-receive system 301 of other vehicles and conveys information resident in signals 332 to evaluation device 342 for processing according to applications 350.

Communication device 318, optical tags 320, optical sensors 321 and controller 322 are operational connected such that in operation, based on input 317 from evaluation device 342, controller 322 causes communication device 318 to emit an optical signal 330 from optical source 324 towards the vehicle to vehicle communication device 316 on another vehicle 304. In the other vehicle 304, optical signal 330 is received by one or more optical tags 320 and one or more optical sensors 321. Optical sensors 321 decode signal 330 and send the decoded signal 370 to its controller 322. In response, controller 322 may generate a modulating signal 372 with its vehicle to vehicle communication device 318 causing one or more of its optical tags 320 to generate a coded optical signal 330.

As shown in FIGS. 9 and 11, one or more optical tags 320 are positioned on each vehicle 304. In one embodiment, the optical tags 320 are positioned at the rear of a vehicle 304. Optical tags 320 can be embedded in or integral with tail lights 400. In one embodiment, tags 320 are also positioned on each vehicle 304. In an alternative embodiment, at least one optical source 324 is positioned at the front of vehicle 304. In a specific embodiment, the optical sources 324 comprise one or more headlights 402 of vehicle 304.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A switchable retroreflector device comprising:
a fluid vessel having an area therein;
an electrically-conductive, polar fluid occupying at least a portion of the fluid vessel;
a non-polar fluid that is immiscible with the polar fluid, the non-polar fluid occupying a portion of the fluid vessel that is not occupied by the polar fluid and that differs from the polar fluid in at least one optical property;
retroreflective surface operably coupled to the fluid vessel and configured to retroreflect light that is incident onto the retroreflective surface as a reflected light, each of the incident light and the reflected light traveling through at least one of the polar and non-polar fluids;
a capacitor disposed on at least a portion of the fluid vessel and in at least partial contact with the polar fluid;
a voltage source electrically coupled to the capacitor, the voltage source configured to selectively apply a voltage to the capacitor and operable to cause the polar fluid to move within the area;
wherein the polar and non-polar fluids have different relative geometrical configurations at different applied voltages and each one of the different geometrical configurations is operable to provide a different level of retroreflection; and
wherein the retroreflective surface has a bead reflector geometry.

2. The switchable retroreflector device of claim 1 wherein the polar and non-polar fluids differ in refractive index, and each of the different levels of retroreflection is provided by the principles of optical refraction and the relative geometrical configurations of the polar and non-polar fluids.

3. The switchable retroreflector device of claim 1 wherein the polar and non-polar fluids differ in optical absorption, and each of the different levels of retroreflection is provided by the principles of optical attenuation and the relative geometrical configurations of the polar and non-polar fluids.

* * * * *